Nov. 3, 1959     H. W. TEMPLETON     2,911,252
RESILIENT WHEEL
Filed April 4, 1957     2 Sheets-Sheet 1
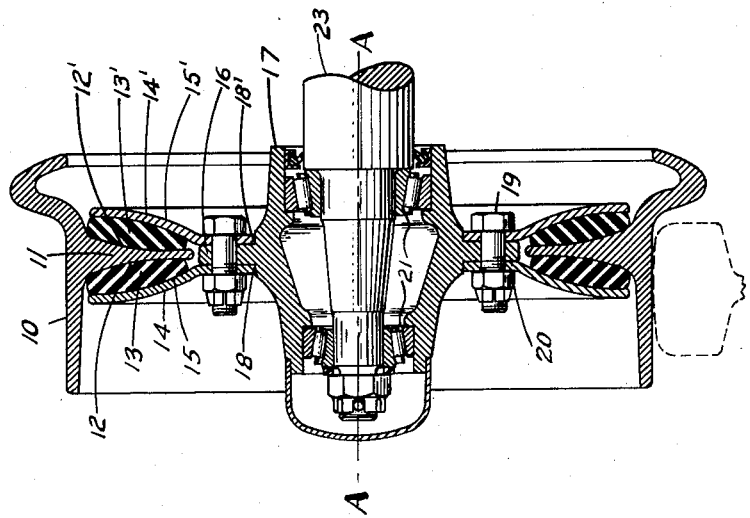
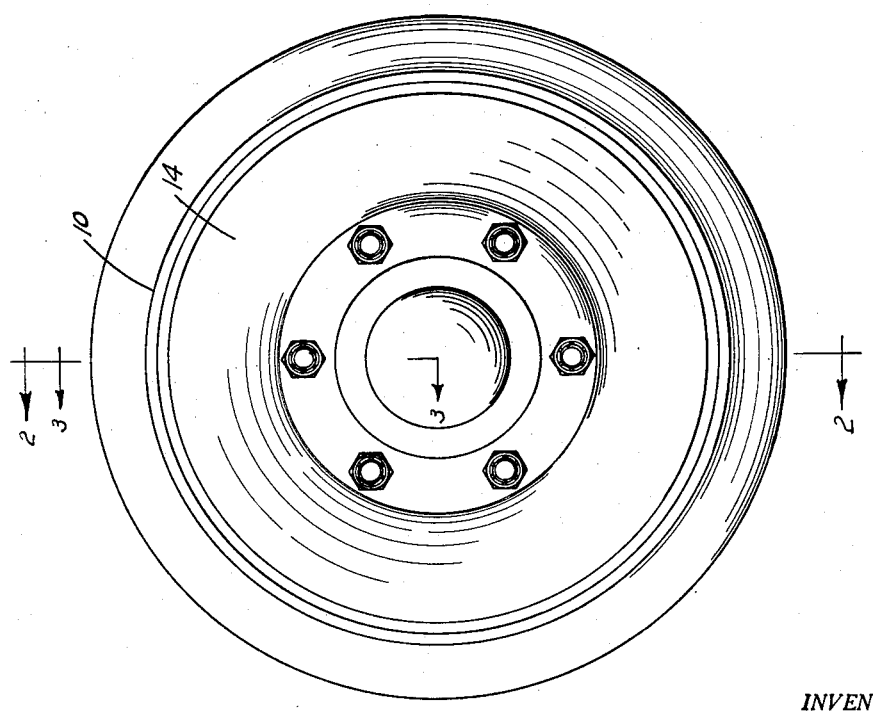
INVENTOR.
HERBERT W. TEMPLETON
BY
SMITH, OLSEN, LEWIS & McRAE INVENTOR.
HERBERT W. TEMPLETON
BY
SMITH, OLSEN, LEWIS & McRAE

United States Patent Office 2,911,252
Patented Nov. 3, 1959

2,911,252

RESILIENT WHEEL

Herbert W. Templeton, Southfield Township, Mich.

Application April 4, 1957, Serial No. 650,763

5 Claims. (Cl. 295—11)

The present invention relates to resilient wheels for vehicles, and more specifically to a car wheel particularly suited for vehicles such as streetcars and railway cars.

It is an object of the present invention to provide a resilient car wheel, such as a railway car wheel, which will absorb a large portion of the shock and vibration encountered by the rim or tread of the wheel, so as to protect the hub, axle and other supporting structure therefrom.

Another object of this invention is to provide such a resilient wheel wherein the high-frequency vibration and noise caused by the rim or tread of the wheel running on a surface are dampened.

A further object of the present invention is to provide an improved structure for mounting a resilient wheel which limits the radial deflection under load and which will be self-energizing in that when the load is removed the rim or tread portion will restore itself to its initial concentric position with relation to its center of rotation.

A still further object of this invention is to provide an improved resilient wheel wherein there is no metal-to-metal contact between wheel tread portion and hub and other supporting structure, so as to provide electrical insulation as well as mechanical insulation.

Another object is to provide a resilient wheel structure in which the resilient elements restrain the rim against lateral displacement in relation to the plane of rotation of the wheel.

Another object of this invention is to provide a resilient wheel which may be easily disassembled for repairs and replacement of parts.

A further object of the present invention is to provide a resilient wheel in which if there is a failure of the resilient mounting means, the rim or tread portion will be retained on the hub portion with very limited radial or lateral motion permitted.

Other objects of this invention will appear in the following description and appended claims, reference being had to the accompanying drawings forming a part of this specification wherein like reference characters designate corresponding parts in the several views.

In the drawings:

Fig. 1 is an elevational view of a resilient wheel structure embodying the present invention.

Fig. 2 is a vertical sectional view taken along line 2—2 of Fig. 1 in the direction of the arrows.

Figure 3:
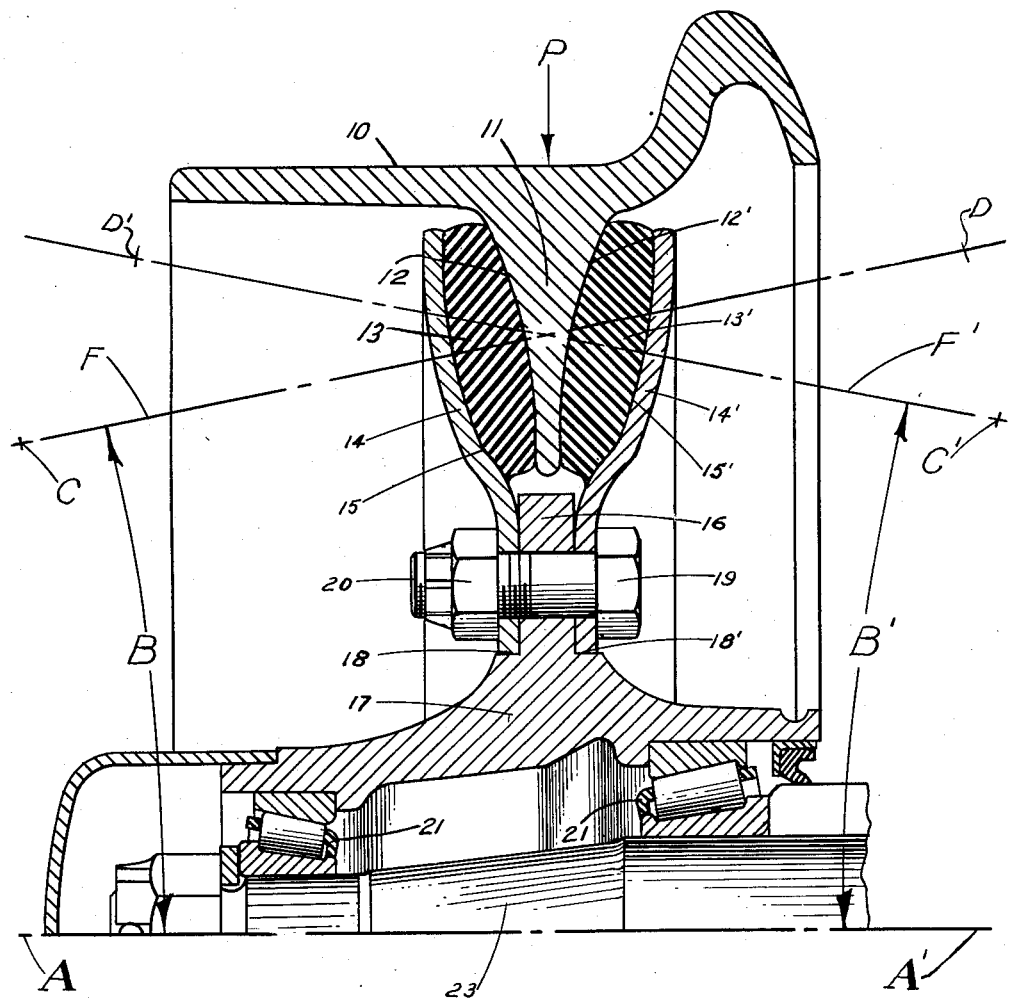
Fig. 3 is an enlarged vertical sectional view taken along line 3—3 of Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring in detail to that embodiment of the invention illustrated in Figs. 1, 2 and 3, the wheel is shown as having a rim 10 provided on its inner periphery with radially inwardly extending annular rim flange 11. The sides 12, 12' of the rim flange 11 are concave and converge toward each other as they progress toward the inner periphery of the flange. The inner extremities of the concave sides 12, 12' are substantially tangent to planes drawn perpendicular to the axis of the rotation of the wheel. As shown in Fig. 3, the normals or central rays F, F' drawn from the foci C, C' of the concave surfaces 12, 12' to the mid-points of the concave surfaces 12, 12' are angularly disposed in relation to the axis A—A' of rotation of the wheel. These angles are indicated by the letters B, B' and are acute.

In facial contact with the sides 12, 12' of the rim flange 11 are annular resilient cushions 13, 13' respectively made of rubber or other suitable material.

A pair of annular hub flanges 14, 14' are disposed one on each side of the rim flange 10 and the resilient cushions 13, 13' are bonded to the faces 15, 15' respectively of the hub flanges 14, 14', by a cement or heat and pressure or other conventional bonding operations.

The faces 15, 15' of the hub flanges 14, 14' are radially symmetrical to the sides 12, 12' of the rim flange 11. That is, as shown in Fig. 3, the central ray from side 12 of the rim flange 11 extended in the opposite direction becomes the central ray of the surface 15 of hub flange 14 and intersects the foci D of the surface 15 and, correspondingly, the central ray F' of side 12' of rim flange 11 extended in the opposite direction becomes the central ray of the surface 15' of hub flange 14' and intersects the foci D' of the surface 15'. The outer extremities of the surfaces 15, 15' are substantially tangent to planes drawn perpendicular to the axis A—A'. Thus, the faces 15, 15' diverge from each other as they progress toward the outer peripheries of the hub flanges 14, 14' and at the same rate that the sides 12, 12' of the rim flange 11 converge.

The hub flanges 14, 14' are dimensioned on their inner peripheries to bear against opposite sides of a web 16 provided on a hub 17 and accurately pilot on shoulders 18, 18' respectively provided on the hub 17 adjacent the base of the web 16.

A plurality of bolts 19 extend through holes provided in hub flanges 14, 14' and web 16 and are provided with nuts 20 to affix the hub flanges to the hub and to compress the rubber cushions 13, 13' against sides 12, 12' respectively of the rim flange 11 to form a firm mechanical bond therewith. The amount of compression or preloading necessary to effect this mechanical bond between cushions 13, 13' and sides 12, 12' respectively of the rim flange 11 is proportional to the load to be carried by the wheel in accordance with the conventional formula $$S = \frac{P}{A}$$

The reason for this preloading and the relative amount thereof will become apparent hereinafter.

The hub 17 is rotatably mounted by any conventional means such as anti-friction bearings 21 carried by a spindle 23 as shown.

Referring specifically to Fig. 3, it can be seen that clearance is provided between the web 16 and the inner periphery of rim flange 11 and also between the outer peripheries of hub flanges 14, 14' and the inner periphery of the rim 10. Thus, all load carried by the wheel is transmitted thru the rubber cushions 13, 13'. In the event of failure of the rubber cushions the rim is still prevented from separation from the wheel because the rim flange 11 is confined laterally between the hub flanges 14, 14' and radially by the web 16.

When load is applied to the rim, as at P (Fig. 3), the desired load-deflection characteristics are obtained by the novel construction of the resilient wheel of the present invention. Because of the concave configuration of the opposed faces of the rim flange 11 and the hub flanges 14, 14', initial movement of the rim 10 toward the hub 17 is carried in shear by the resilient cushions 13, 13'. Thus, minor vibrations caused by the rim running over an irregular surface are quickly and readily absorbed by the cushions 13, 13' acting in shear which is known to be the most efficient way for such cushions to act. However, as deflection of the rim 10 increases, such as would result from the rim striking larger irregularities in the surface on which it is running, the result of the concave opposed surfaces is for the cushions 13, 13' to act increasingly in compression and relatively less in shear.

Thus, the resilient wheel construction of the present invention readily absorbs minor shocks and vibrations while at the same time providing for increasing loading of the resilient elements in compression as the deflection of the rim increases. Thereby, the larger jolts are carried by the resilient element relatively more in compression than in shear which prevents the wheel from "bottoming," i.e. exceeding the shear capacity of the resilient elements, thereby very materially increasing the fatigue life of the resilient elements.

In the side of the wheel diametrically opposed to that illustrated in Fig. 3, it is apparent that the opposite stress conditions will prevail. That is, the rim is being deflected away from the hub. Therefore, because of the converging of the sides 12, 12' of the rim flange 11 and the diverging of the faces 15, 15' of the hub flanges 14, 14', the resilient cushions are acting increasingly in shear and relatively less in compression. Thus, the rim tends to center itself concentrically in relation to the hub through the resiliency of the resilient cushions acting completely around the wheel.

In order to maintain an effective mechanical engagement or frictional bond between the rim flange and the resilient cushions, the preloading of the cushions must be sufficient to assure that the combined tension and shear resulting from the movement of flange 10 away from the hub 17 does not exceed the maximum allowable unit bond stresses between the two materials involved. Because the two resilient elements, compressively retained between opposing concave surfaces 12 and 15, and 12' and 15' respectively, resist lateral loads, such as would be imposed by frictional cornering forces or thrust forces transmitted thru the rim 10, by compression of the resilient elements, the wheel structure is retained in accurate lateral alignment. This is true because the modulus of resilient materials is always greater in compression than in shear, in the case of rubber this being four times, and because a greater effective area of the resilient elements is inherently provided in this construction, to resist lateral and thrust loads.

By making the resilient elements of the resilient wheel of rubber or like non-conducting material, the wheel of the present invention is adaptable to be used on railway vehicles without short circuiting between the rails through the axles of the vehicle.

Thus, it can be seen that by the present invention I have provided a resilient wheel construction which effectively dampens the low amplitude, high frequency vibrations which result from the runing of the rim on a surface and which will also absorb high amplitude, low frequency shocks without exceeding the capacity of the resilient elements of the wheel.

Also, the resilient wheel of the present invention can be seen to be self-energizing in that it returns itself to concentricity after it has absorbed shocks and vibrations.

Further, the resilient wheel structure of the present invention can be readily disassembled for replacement and repair and is readily adaptable to mass production techniques thereby reducing the cost thereof.

Having thus described my invention, I claim:

1. A resilient wheel comprising: a rim having an annular rim flange extending radially inward therefrom, the sides of said rim flange being concave and converging toward each other as they progress toward the inner periphery of said rim flange; a hub having a pair of annular hub flanges extending radially outward therefrom and positioned one on each side of said rim flange and in spaced relationship thereto, the opposed faces of said hub flanges being concave and diverging from each other as they progress radially outward; and resilient elements disposed between said rim flange and said hub flanges and engaging the opposed faces thereof.

2. A resilient wheel as claimed in claim 1 and further characterized in that the inner extremities of the said sides of said rim flange are substantially tangent to planes perpendicular to the axis of rotation of said wheel; and in that the outer extremities of the said concave faces of said hub flanges are substantially tangent to planes perpendicular to the axis of rotation of said wheel.

3. A resilient wheel comprising: a rim having an annular rim flange extending radially inward therefrom, the sides of said rim flange being concave; a hub having a pair of annular hub flanges extending radially outward therefrom and positioned one on each side of said rim flange and in spaced relationship therefrom, the opposed faces of said hub flanges being concave; an annular resilient element disposed between each of said hub flanges and the opposed side of said rim flange each of said resilient elements being bonded to the face of said hub flange that it engages; and means urging said hub flanges toward each other to preload said resilient elements and maintain them in frictional engagement with the sides of said rim flange.

4. A resilient wheel comprising: a hub having an annular web portion extending radially outward therefrom; and a peripheral shoulder on each side of said web portion adjacent the base thereof; two annular hub flanges each provided with a concave side face detachably secured one on each side of said web portion and the inner peripheries of said hub flanges engaging said peripheral shoulders and said hub flanges being positioned with their concave faces facing each other and diverging radially outward from each other; a rim having an annular rim flange extending radially inward therefrom and positioned between the opposed concave faces of said hub flanges, the sides of said rim flange being concave and converging radially inward; a pair of annular resilient cushions interposed between the concave faces of said hub flanges and the opposed sides of said rim flange, each of said resilient cushions being bonded to the concave face of the hub flange which it engages; and means urging said hub flanges toward each other to preload said resilient cushions thereby maintaining the cushions in frictional engagement with the sides of said rim flange.

5. A resilient wheel as claimed in claim 4 and further characterized in that the inner extremities of the concave sides of said rim flange and the outer extremities of the concave faces of said hub flanges are substantially tangent to planes drawn perpendicular to the axis of rotation of said wheel.

References Cited in the file of this patent

UNITED STATES PATENTS

| | | |
|---|---|---|
| 1,982,043 | Brownyer | Nov. 27, 1934 |
| 2,059,256 | Latshaw | Nov. 3, 1936 |
| 2,674,897 | Heinish | Apr. 13, 1954 |
| 2,800,357 | Boschi | July 23, 1957 |

FOREIGN PATENTS

| | | |
|---|---|---|
| 696,627 | Great Britain | Sept. 2, 1953 |